(12) United States Patent
Effenberger et al.

(10) Patent No.: US 9,319,139 B2
(45) Date of Patent: Apr. 19, 2016

(54) LONG DISTANCE MULTI-MODE COMMUNICATION

(71) Applicant: Futurewei Technologies, Inc., Plano, TX (US)

(72) Inventors: Frank Effenberger, Colts Neck, NJ (US); Ning Cheng, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 101 days.

(21) Appl. No.: 14/203,832

(22) Filed: Mar. 11, 2014

(65) Prior Publication Data

US 2015/0280826 A1 Oct. 1, 2015

Related U.S. Application Data (60) Provisional application No. 61/776,434, filed on Mar. 11, 2013.

(51) Int. Cl.
| | | |
|---|---|---|
| *H04J 14/04* | (2006.01) | |
| *H04J 14/08* | (2006.01) | |
| *H04B 10/12* | (2006.01) | |
| *H04B 10/2581* | (2013.01) | |
| *H04B 10/27* | (2013.01) | |
| *H04B 10/2507* | (2013.01) | |

(52) U.S. Cl.
CPC ........ *H04B 10/2581* (2013.01); *H04B 10/2507* (2013.01); *H04B 10/27* (2013.01); *H04J 14/08* (2013.01)

(58) Field of Classification Search
None
See application file for complete search history.

(56) References Cited

U.S. PATENT DOCUMENTS

| 7,218,814 | B2 | 5/2007 | Vorobeichik et al. | |
|---|---|---|---|---|
| 7,539,373 | B1 * | 5/2009 | Logvin | G02B 6/12004 385/28 |
| 7,907,843 | B2 * | 3/2011 | Yamaji | H04J 3/1694 398/100 |
| 8,326,152 | B2 * | 12/2012 | Van Veen | H04B 10/07955 398/160 |
| 8,515,278 | B2 | 8/2013 | Cheng et al. | |
| 2007/0140689 | A1 * | 6/2007 | Haran | H04B 10/0793 398/27 |
| 2010/0067901 | A1 * | 3/2010 | Mizutani et al. | 398/20 |
| 2010/0111537 | A1 * | 5/2010 | Cheng | G02B 6/12004 398/82 |

OTHER PUBLICATIONS

Lin, Chinlon, Broadband Optical Access Networks and Fiber-to-the-Home: Systems Technologies and Deployment Strategies, 2006, Joh Wiley & Sons Ltd., p. 117.*
Chochiliouros et al., Optical Access Networks and Advanced Photonics: Technologies and Deployment Strategies, 2010, IGI Global, pp. 125-128.*

(Continued)

*Primary Examiner* — Ken N Vanderpuye
*Assistant Examiner* — Jai Lee
(74) *Attorney, Agent, or Firm* — Conley Rose, P.C.; Grant Rodolph; Brandt D. Howell (57) ABSTRACT

An optical line terminal (OLT) comprising a receiver configured to couple to a mode coupler via a multi-mode optical fiber that supports more than one optical communication mode, and couple to a plurality of optical network units (ONUs) via the mode coupler, a processor coupled to the receiver and configured to schedule upstream multi-mode transmissions from the ONUs via the multi-mode fiber and the mode coupler by employing time division multiplexing (TDM), and a transmitter coupled to the processor and configured to transmit schedule data to the ONUs.

18 Claims, 8 Drawing Sheets

(56) References Cited

OTHER PUBLICATIONS

Furukawa Company, OM4—The Next Generation of Multimode Fiber, 2011.*
"Series G: Transmission Systems and Media, Digital Systems and Networks, Digital Sections and Digital Line System—Optical Line Systems for Local and Access Networks, Broadband Optical Access Systems Based on Passive Optical Networks (PON)", ITU-T Recommendation G.983.1, Jan. 2005, 124 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON), Amendment 1: PICS for OLT and ONU", ITU-T Recommendation G.983.1 Amendment 1, May 2005, 60 pages.
"Series G: Transmission Systems and Media, Digital Systems and Networks, Digital Sections and Digital Line System—Optical Line Systems for Local and Access Networks, Broadband Optical Access Systems Based on Passive Optical Networks (PON)", ITUT-T Recommendation G.983.1 Erratum 1, Mar. 2006, 1 page.
"Series G: Transmission Systems and Media, Digital Systems and Networks, Digital Sections and Digital Line System—Optical Line Systems for Local and Access Networks, ONT Management and Control Interface Specification for B-PON", ITU-T Recommendation G.983.2, Jul. 2005, 370 pages.
"Series G: Transmission Systems and Media, Digital Systems and Networks, Digital Sections and Digital Line System—Optical Line Systems for Local and Access Networks, ONT Management and Control Interface Specification for B-PON, Amendment 1: Omnibus Improvements for OMCI", ITU-T Recommendation G.983.2 Amendment 1, Mar. 2006, 198 pages.
"Series G: Transmission Systems and Media, Digital Systems and Networks, Digital Sections and Digital Line System—Optical Line Systems for Local and Access Networks, ONT Management and Control Interface Specification for B-PON, Amendment 2", ITU-T Recommendation G.983.2 Amendment 2, Jan. 2007, 64 pages.
"Series G: Transmission Systems and Media, Digital Systems and Networks, Digital Sections and Digital Line System—Optical Line Systems for Local and Access Networks, ONT Management and Control Interface Specification for B-PON, Erratum 1", ITU-T Recommendation G.983.2 Erratum 1, Jun. 2006, 1 page.
"Series G: Transmission Systems and Media, Digital Systems and Networks, Digital Sections and Digital Line System—Optical Line Systems for Local and Access Networks, A Broadband Optical Access System with Increased Service Capability by Wavelength Allocation", ITU-T Recommendation G.983.3, Mar. 2001, 59 pages.
"Series G: Transmission Systems and Media, Digital Systems and Networks, Digital Sections and Digital Line System—Optical Line Systems for Local and Access Networks, A Broadband Optical Access System with Increased Service Capability Using Dynamic Bandwidth Assignment", ITU-T Recommendation G.983.4, Nov. 2001, 92 pages.
"Series G: Transmission Systems and Media, Digital Systems and Networks, Digital Sections and Digital Line System—Optical Line Systems for Local and Access Networks, A Broadband Optical Access System with Increased Service Capability Using Dynamic Bandwidth Assignment, Amendment 1: New Annex A—Performance Monitoring Parameters", ITU-T Recommendation G.983.4 Amendment 1, Dec. 2003, 12 pages.
Series G: Transmission Systems and Media, Digital Systems and Networks, Digital Sections and Digital Line System—Optical Line Systems for Local and Access Networks, A Broadband Optical Access System with Increased Service Capability Using Dynamic Bandwidth Assignment, G.983.4, Corrigendum 1, Jan. 2005, 8 pages.
"Series G: Transmission Systems and Media, Digital Systems and Networks, Digital Sections and Digital Line System—Optical Line Systems for Local and Access Networks, A Broadband Optical Access System with Enhanced Survivability", ITU-T Recommendation G.983.5, Jan. 2002, 60 pages.
"Series G: Transmission Systems and Media, Digital Systems and Networks, Digital Sections and Digital Line System—Optical Line Systems for Local and Access Networks, Gigabit-capable Passive Optical Networks (GPON): General Characteristics", ITU-T Recommendation G.984.1, Mar. 2008, 43 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification", ITU-T Recommendation G.984.2, Mar. 2003, 38 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification, Amendment 1: New Appendix III—Industry Best Practice for 2.488 Gbit/s Downstream, 1.244 Gbit/s Upstream G-PON", ITU-T Recommendation G.984.2 Amendment 1, Feb. 2006, 12 pages.
"Series G: Transmission Systems and Media, Digital Systems and Networks, Digital Sections and Digital Line System—Optical Line Systems for Local and Access Networks, Gigabit-capable Passive Optical Networks (GPON): Physical Media Dependent (PMD) Layer Specification, Amendment 2", ITU-T Recommendation G.984.2 Amendment 2, Mar. 2008, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification", ITU-T Recommendation G.984.3, Mar. 2008, 146 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 1—Specification of the ONU Registration Method and Various Clarifications", ITU-T Recommendation G.984.3 Amendment 1, Feb. 2009, 16 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 2: Time-of-Day Distribution and Maintenance Updates and Clarifications", ITU-T Recommendation G.984.3 Amendment 2, Nov. 2009, 18 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Amendment 3", ITU-T Recommendation G.984.3 Amendment 3, Apr. 2012, 18 pages.
"Series G: Transmission Systems and Media, Digital Systems and Networks, Digital Sections and Digital Line System—Optical Line Systems for Local and Access Networks, Gigabit-capable Passive Optical Networks (G-PON): Transmission Convergence Layer Specification, Erratum 1", ITU-T Recommendation G.984.3, Erratum 1, Apr. 2010, 1 page.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification", ITU-T Recommendation 984.4, Feb. 2008, 430 pages.
"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 1", ITU-T Recommendation G.984.4 Amendment 1, Jun. 2009, 92 pages.
"Series G: Transmission Systems and Media, Digital Systems and Networks, Digital Sections and Digital Line System—Optical Line Systems for Local and Access Networks, Gigabit-capable Passive (56) References Cited

OTHER PUBLICATIONS

Optical Networks (G-PON): ONT Management and Control Interface Specification, Erratum 1", ITU-T Recommendation G.984.4 Erratum 1, Aug. 2009, 2 pages.

"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 2: Changes and Extensions to the OMCI, Editorial Clarifications and Corrections", ITU-T Recommendation G.984.4 Amendment 2, Nov. 2009, 164 pages.

"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Amendment 3: Clarification of Scope of Application", ITU-T Recommendation G984.4 Amendment 3, Jul. 2010, 10 pages.

"Series G: Transmission Systems and Media, Digital Systems and Networks, Digital Sections and Digital Line System—Optical Line Systems for Local and Access Networks, Gigabit-capable Passive Optical Networks (G-PON): ONT Management and Control Interface Specification, Corrigendum 1", ITU-T Recommendation G.984.4, Corrigendum 1, Mar. 2010, 8 pages.

"Series G: Transmission Systems and Media, Digital Systems and Networks, Digital Sections and Digital Line System—Optical Line Systems for Local and Access Networks, Gigabit-capable Passive Optical Networks (G-PON): Enhancement Band", ITU-T Recommendation G.984.5, Sep. 2007, 22 pages.

"Series G: Transmission Systems and Media, Digital Systems and Networks, Digital Sections and Digital Line System—Optical Line Systems for Local and Access Networks, Gigabit-capable Passive Optical Networks (G-PON): Enhancement Band, Amendment 1", ITU-T Recommendation G.984.5 Amendment 1, Oct. 2009, 12 pages.

"Series G: Transmission Systems and Media, Digital Systems and Networks, Digital Sections and Digital Line System—Optical Line Systems for Local and Access Networks, Gigabit-capable Passive Optical Networks (G-PON): Reach Extension", ITU-T Recommendation G.984.6, Mar. 2008, 40 pages.

"Series G: Transmission Systems and Media, Digital Systems and Networks, Digital Sections and Digital Line System—Optical Line Systems for Local and Access Networks, Gigabit-capable Passive Optical Networks (G-PON): Reach Extension, Amendment 1: Wavelength-converting, Continuous Mode, and 1:N-protected Range Extenders", ITU-T Recommendation G.984.6 Amendment 1, Nov. 2009, 28 pages.

"Series G: Transmission Systems and Media, Digital Systems and Networks, Digital Sections and Digital Line System—Optical Line Systems for Local and Access Networks, Gigabit-capable Passive Optical Networks (G-PON): Reach Extension, Amendment 2", ITU-T Recommendation G.984.6 Amendment 2, May 2012, 16 pages.

"Series G: Transmission Systems and Media, Digital Systems and Networks, Digital Sections and Digital Line System—Optical Line Systems for Local and Access Networks, Gigabit-capable Passive Optical Networks (G-PON): Long Reach", ITU-T Recommendation G.984.7, Jul. 2010, 14 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks", IEEE Standard 802.3ah, Sep. 7, 2004, 640 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks", IEEE Standard 802.3av, Oct. 30, 2009, 236 pages.

Fontaine, N., et al., "Mode-Selective Dissimilar Fiber Photonic-Lantern Spatial Multiplexers for Few-Mode Fiber", Proceedings of European Conference on Optical Communications, London, Sep. 22-26, 2013, 3 pages.

* cited by examiner

LONG DISTANCE MULTI-MODE COMMUNICATION

CROSS-REFERENCE TO RELATED APPLICATIONS

The present application claims priority to U.S. Provisional Patent Application 61/776,434 filed Mar. 11, 2013 by Frank Effenberger and Ning Cheng and entitled "Mode Transformation Coupler," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access between the edge of a service provider's network and the end consumer. The PON is a point-to-multipoint (P2MP) network comprised of an optical line terminal (OLT) at the central office, an optical distribution network (ODN), and a plurality of optical network units (ONUs) at the customer premises. PONs may also comprise remote nodes (RNs) located between the OLTs and the ONUs, for example, at the end of a road where multiple users reside. In recent years, various PON systems have been developed including Gigabit PONs (GPONs) and Ethernet PONs (EPONs), which have been deployed worldwide for multimedia applications. User bandwidth demands are ever increasing, and ten gigabits per second (10G) PONs (10G-PONs), such as International Telecommunication Union (ITU-T) 10G PON (XG-PON) and 10G EPON, have also been standardized for next generation optical access. Such PON systems may be limited by a power budget. For reasons related to power budget, the number of users who can be served by each PON system may be limited to 64 and the transmission distance may be limited to about 20 kilometers (km). PON operators are interested in increasing splitting ratios and increasing range so that more users may be served and larger areas may be covered.

SUMMARY

In one embodiment, the disclosure includes an OLT comprising a receiver configured to couple to a mode coupler via a multi-mode optical fiber that supports more than one optical communication mode, and couple to a plurality of ONUs via the mode coupler, a processor coupled to the receiver and configured to schedule upstream multi-mode transmissions from the ONUs via the multi-mode fiber and the mode coupler by employing time division multiplexing (TDM), and a transmitter coupled to the processor and configured to transmit schedule data to the ONUs.

In another embodiment, the disclosure includes a method implemented in an OLT comprising communicating with a plurality of ONUs using TDM for upstream optical signals traversing a mode coupler and a multi-mode optical fiber that supports more than one optical communication mode, measuring the upstream optical signals from the ONUs to determine power levels exhibited by the upstream optical signals, scheduling upstream communication timeslots for the ONUs such that upstream optical signals are arranged in time order based on power level, and transmitting schedule data to the ONUs.

In another embodiment, the disclosure includes an OLT comprising a receiver configured to couple to a plurality of ONUs via a multi-mode optical fiber that supports more than one optical communication mode, a mode coupler, and a plurality of single mode optical fibers, receive upstream data signals from the ONUs via the multi-mode optical fiber, wherein the upstream data signals are received in a plurality of modes, wherein the upstream data signals are not received simultaneously regardless of data signal mode, and wherein the received upstream data signals are received over a continuous span of the multi-mode optical fiber with a length greater than one hundred meters, and separate the upstream data signals into a plurality of data streams corresponding to each transmitting ONU.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While the downstream power budget in PON may be readily improved, the upstream power budget may be more limited. For instance, the OLT may increase downstream transmit power by employing a higher power transmitter or an optical amplifier, whereas ONUs may employ low cost lasers with low power. In addition, there may be a lower loss in the downstream direction because the downstream transmissions may employ wavelengths in the S-band (1490 nanometers (nm) for GPON and EPON) or the L-band (1577 nm for XG-PON and 10G-EPON), whereas the upstream transmissions may employ wavelengths in the O-band (1310 nm for GPON and EPON or 1270 nm for XG-PON and 10G EPON). Further, burst mode transmission used in the upstream direction may introduce additional power penalties compared to continuous mode transmissions, which may be employed in the downstream direction. Since ONUs may be cost limited, it may not be practical to increase the ONUs transmit power.

Insertion loss is one factor that may negatively impact transmission power. Insertion loss may be a loss in power attributable to the insertion of a device between a transmission source and a receiver, and may be expressed in decibels (dBs). As discussed in U.S. Pat. No. 8,515,278 by Ning Cheng and Frank Effenberger and entitled "Passive Optical Networks with Mode Coupling Receivers," which is incorporated herein by reference as if reproduced in its entirety, long-reach/large splitting PON systems may be achieved by employing low insertion loss mode couplers. Such mode couplers may be employed to couple a plurality of single mode fibers into a multi-mode fiber for transmission to the OLT. The inclusion of low insertion loss mode couplers may reduce system insertion loss and hence reduce the insertion losses impact on the ONUs upstream transmission power. However, multi-mode transmissions may introduce additional constraints on a system. Specifically, multi-mode transmissions may only be effective for very short distances, e.g. about one hundred meters or less. Over longer distances, multi-mode transmissions may become co-mingled, which may prevent a receiver for differentiating between the individual signals. As such, the single mode fibers of such a system must extend to the service provider premises, with the multi-mode coupling occurring within the OLT (or within the same room/building as the OLT).

Disclosed herein is a mechanism for extending the reach of the multi-mode portion of long-reach PON system. A few mode fiber may be employed between the OLT and the mode coupler. A few mode fiber may be a multi-mode fiber that supports about ten or less modes (e.g. three, five, seven, etc.) The OLT may employ time division multiplexing (TDM) and/or time division multiple access (TDMA) for upstream transmissions so that no two upstream transmissions traverse the few mode fiber at the same time. As such, mode interference may be substantially eliminated, which may allow the few mode fiber to extend for about twenty to forty km from the OLT. Accordingly, the number of optical fiber lines from the ODN to the service provider may be dramatically reduced, which may result in significant cost savings. Further, different modes may propagate across the few mode fiber at different rates, which may result in leading and/or trailing portions of some signals being received in adjacent time slots. Such interference may not present significant processing difficulties when two signals are received at substantially the same power. However, a portion of a high power signal may substantially overwrite a portion of a low power signal. As such, ONU upstream transmission may be scheduled such that ONUs with differing power levels (e.g. due to distance, transmitter power, etc.) are not scheduled in adjacent time slots, which may substantially reduce the effects of multi-mode propagation delay related interference in a TDM scheme.

Figure 1:
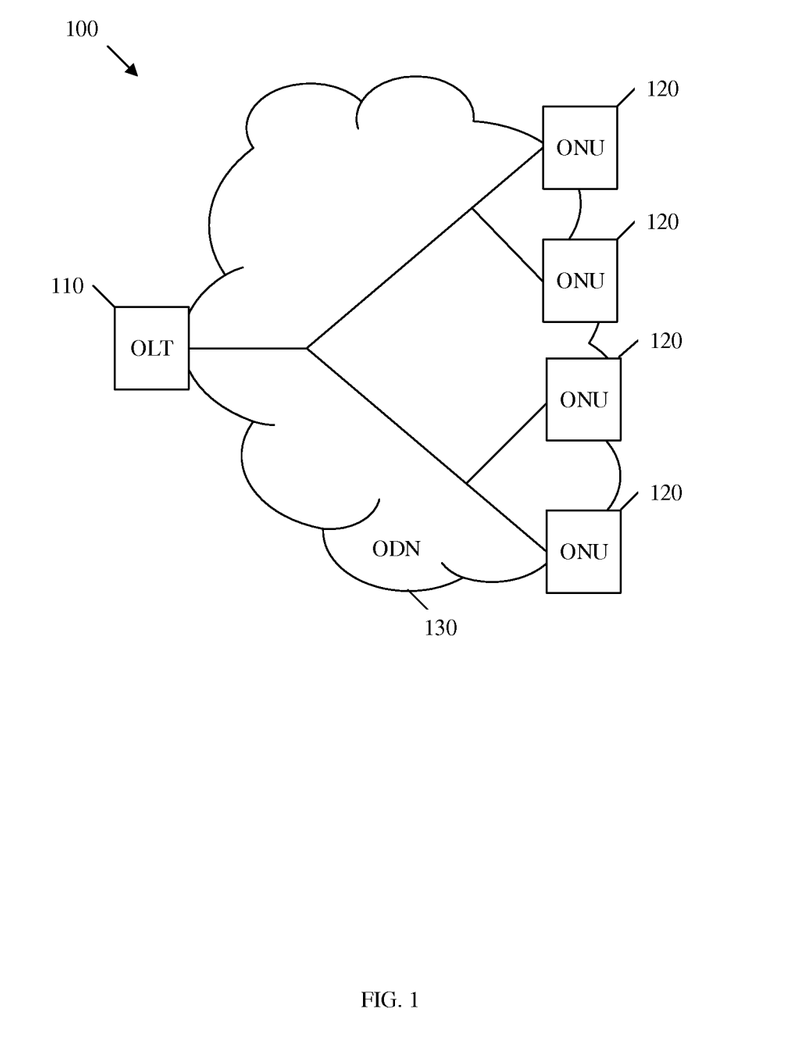
FIG. 1 is a schematic diagram of an embodiment of a PON.

FIG. 1 is a schematic diagram of an embodiment of a PON 100. The PON 100 comprises an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as an XGPON, which may have a downstream bandwidth of about ten Gigabits per second (Gbps) and an upstream bandwidth of at least about 2.5 Gbps. Alternatively, the PON 100 may be any Ethernet based network, such as an EPON defined by the Institute of Electrical and Electronics Engineers (IEEE) 802.3ah standard, a 10 Gigabit EPON as defined by the IEEE 802.3av standard, an asynchronous transfer mode PON (APON), a broadband PON (BPON) defined by ITU-T G.983 standard, a GPON defined by the ITU-T G.984 standard, or a wavelength division multiplexed (WDM) PON (WPON). All of these standards are incorporated herein by reference.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be located at a central location, such as a central office, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may extend from the OLT 110 to the ONUs 120 in a branching configuration as shown in FIG. 1, but may be alternatively configured in any other point-to-multi-point configuration.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to/from a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

Figure 2:
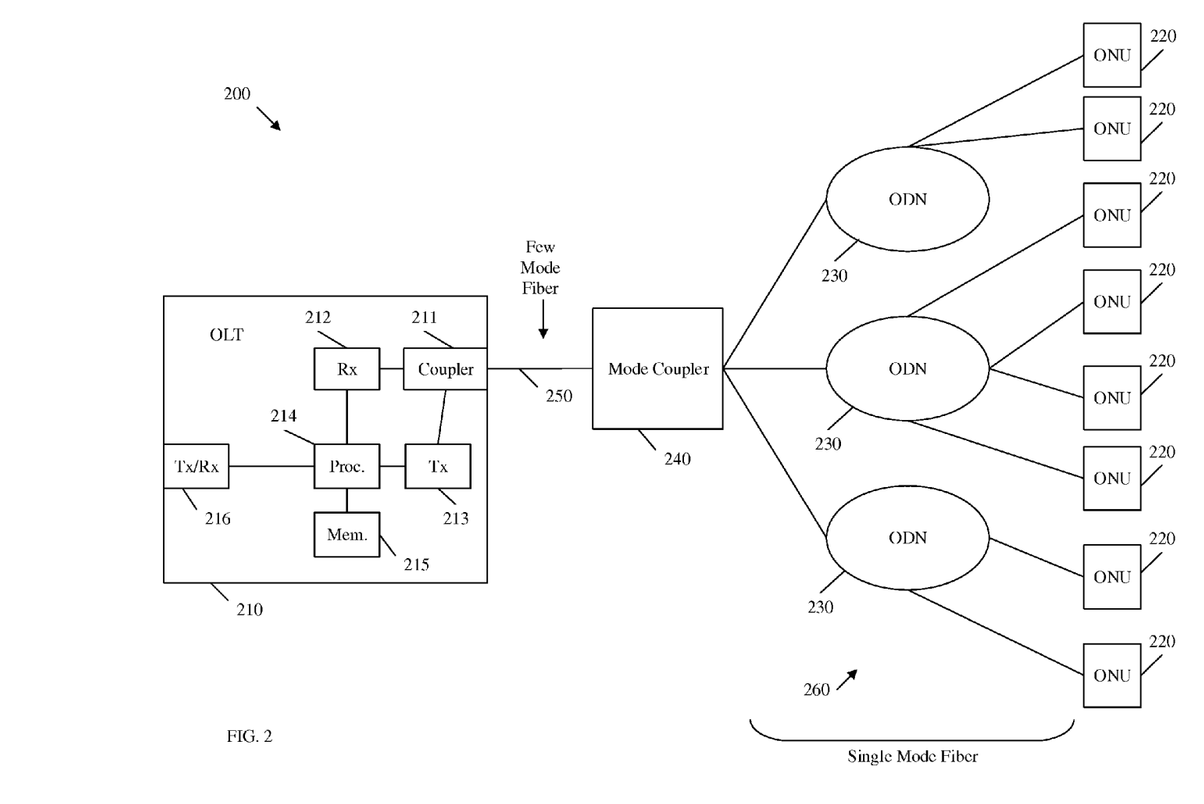
FIG. 2 is a schematic diagram of an embodiment of a long-reach/large splitting PON.

FIG. 2 is a schematic diagram of an embodiment of a long-reach/large splitting PON 200, which may have an increased maximum transmission distance, e.g. greater than about 20 km. Similar to the PON 100, the long-reach/large-splitting PON 200 may be a GPON, EPON, APON, BPON, WPON, or NGA system. The long-reach/large-splitting PON 200 may have an increased splitting ratio, e.g. greater than about 1:64. Specifically, the long-reach/large-splitting PON 200 may be configured for longer maximum transmission distance and/or larger splitting ratio without employing an optical amplifier or regenerator in the system. The long-reach/large-splitting PON 200 may comprise an OLT 210 and a plurality of ONUs 220 coupled by a plurality of ODNs 230, which may be similar to an OLT 110, ONUs 120, and ODN 130, respectively. The ONUs 220 and the ODNs 230 may be coupled via single mode fibers 260. The single mode fibers 260 may be coupled to the OLT 210 via a few mode fiber 250 and a mode coupler 240. The mode coupler 240 may be positioned at a transmission distance from the OLT (e.g. 20-40 km), and the PON 200 may employ a TDM/TDMA scheduling system to allow multi-mode communications to cross the few mode fiber without becoming unreadable due to intermodal cross-talk. Associated mode dispersion of the signal may be mitigated by electronic dispersion compensation.

The OLT 210 may be configured to communicate with the ONUs 220 and another upstream network (not shown) and may act as an intermediary between the upstream network and the ONUs 220. The OLT 210 may comprise a coupler 211, a receiver (Rx) 212, a transmitter (Tx) 213, a processor 214, a memory 215, and an upstream transceiver (Tx/Rx) 216. The Rx 212 may be comprise a photodetector with a diameter great enough to capture the sum of all modes of light transmitted upstream across the few mode fiber 250. The receiver may also comprise dedicated processors, electro-optical converters, and/or storage to allow the receiver to convert received optical signals into buffered electrical/data signals based on a schedule. The receiver may not employ coherent detection for signals transmitted across few mode fiber 250, as may be typical for multi-mode transmissions. The Tx 213 may comprise an optical transmitter, such as a laser, configured to modulate optical signals onto a fiber based on electrical input. The Tx 213 and the Rx 212 may be coupled to the few mode fiber 250 via a coupler 211, which may be any device configured to allow light from the few mode fiber 250 to the Rx 212 and forward (e.g. refract) optical signals from the Tx 213 onto the few mode fiber 250 for downstream transmission. The Tx 213 and Rx 212 may be coupled to a processor 214, which may be any general processor configured to create transmission schedules, receive data, process data, and instruct other components to forward data. The processor 214 may be coupled to memory 215 for storage. The processor 214 may be configured to communicate data upstream to the upstream network via Tx/Rx 216 and communicate data downstream via Rx 212 and Tx 213.

Few mode fiber 250 may be a multi-mode fiber. A multi-mode fiber may be any optical fiber configured to simultaneously conduct light signals in a plurality of modes. Light signal modes may be light signals separated by physical space in the same fiber, as discussed in greater detail herein below. A few mode fiber 250 may be a multi-mode fiber configured to conduct a small number of modes (e.g. less than ten modes, seven modes, five modes, etc.). A few mode fiber 250 may be manufactured to conduct specific numbers of modes, for example based on fiber diameter, material composition, etc. It should also be noted that, while multi-mode fibers (and few mode fibers) may typically comprise very small lengths (e.g. a meter or less) in order to produce receivable signals despite intermodal interference, few mode fiber 250 may comprise a length appropriate for long range transmission (e.g. greater than 100 meters (m), 500 m, one km, five km, ten km, fifteen km, twenty km, twenty five km, thirty km, thirty-five km, forty km, etc.) The increased transmission length of few mode fiber 250 may be achieved due to TDM and/or TDMA as discussed herein.

Mode coupler 240 may be coupled to few mode fiber 250. As such, mode coupler 240 may be logically positioned at the edge of ODNs 230. Due to the length of few mode fiber 250, mode coupler 240 may not be positioned at a central office (e.g. may be positioned in a different building than OLT 210). Mode coupler 240 may be configured to couple a plurality of single mode fibers 260 into few mode fiber 250. As such, mode coupler 240 may receive upstream communications from single mode fibers 260 and forward such communications across few mode fiber 250 as well as receive downstream communications from few mode fiber 250 and split such communications across single mode fibers 260. Mode coupler 240 and/or few mode fiber 250 may be designed to minimize insertion loss between the single mode fibers 260 and Rx 212 in order to increase the power budget and associated range and splitting ratio of PON 200.

The ODNs 230 may comprise a plurality of ODN splitters/combiners that receive downstream optical signals form the OLT 210. The ODN splitters/combiners may be any devices configured to split the downstream optical signals from the OLT 210 into a plurality of downstream signal copies and forward upstream signals toward the OLT 210. The downstream signal copies may be forwarded to the ONUs 220, which may be configured similar to the ONUs 130. Specifically, each of the ODN splitters may be coupled to optical signal separators via a first plurality of fiber cables, e.g. bidirectional fiber cables, and to a plurality of corresponding ONUs 220 via another plurality of fiber cables similar to the first plurality of fiber cables. In an embodiment, the ONUs 220 may be coupled to each ODN splitter via a plurality of fiber cables, which may be coupled in parallel in a single aggregate cable. The ODNs 230 may comprise the single mode fibers 260, which may be any fibers configured to support transmission of optical signals in a single mode.

It should be noted that multi-mode and/or few mode fibers may typically be employed to transport multiple optical signals at the same time to increase system throughput. Due to optical dispersion, refraction, and/or other qualities associated with multi-mode fibers, simultaneous multi-mode transmissions may begin to suffer from intermodal cross-talk over distance. As such, simultaneous multi-mode transmissions may have a very limited range (e.g. less than 100 m). PON 200 may employ TDM/TDMA to substantially eliminate intermodal cross-talk by preventing the multi-modal transmissions from being simultaneous. By removing the intermodal cross-talk, the effective range of the multi-mode transmissions may be increased dramatically (e.g. 20-40 km). In PON 200, mitigation of the intermodal cross-talk may allow the mode coupler 240 to be positioned at a substantial distance from the central office, which may eliminate the need to bring all the single mode fibers 260 all the way to the central office. In PON 200, a single optical line (few mode fiber 250) may support all of the ODNs 230, which may result in a substantial cost savings associated with laying fiber from the central office out to the ONUs 220. Further, a person of ordinary skill in the art would understand that it would not be obvious to employ TDM/TDMA over a multi-mode fiber, because a multi-mode fiber may typically employed for increasing through put by supporting simultaneous transmissions, while TDM/TDMA may typically be employed for serial transmissions. However, the few mode coupler 240 and few mode fiber 250 may reduce insertion loss, and throughput may be a less important consideration in PON 200 than power budget. As such, employing TDM/TDMA over few mode fiber 250 may support a reduction in power budget for increased transmission length at an acceptable cost to throughput.

It should also be noted that TDM and TDMA may both be mechanisms to assign timeslots to ONUs for transmissions. As such, TDM and TDMA may be used interchangeably herein. To implement TDM/TDMA in PON 200, processor 214 may create a transmission schedule as discussed below. The transmission schedule may assign timeslots for each ONU 220 to transmit data toward the OLT 210. The processor 214 may then cause the Tx 213 to transmit the schedule downstream to the ONUs 220. By transmitting based on the schedule, multi-mode signals from the ONUs 220 may each traverse few mode fiber 250 at a different time, which may mitigate intermodal cross-talk. Also as discussed below, the processor 214 and/or receiver 212 may measure ONU 220 range, transmission burst power level (e.g. which may vary based on ONU power, range, and ODN 230 variability), and time based intermodal cross-talk resulting from uneven propagation delay for different modes, and may schedule ONU 220 timeslots to mitigate any remaining intermodal cross-talk not eliminated by TDM.

Figure 3:
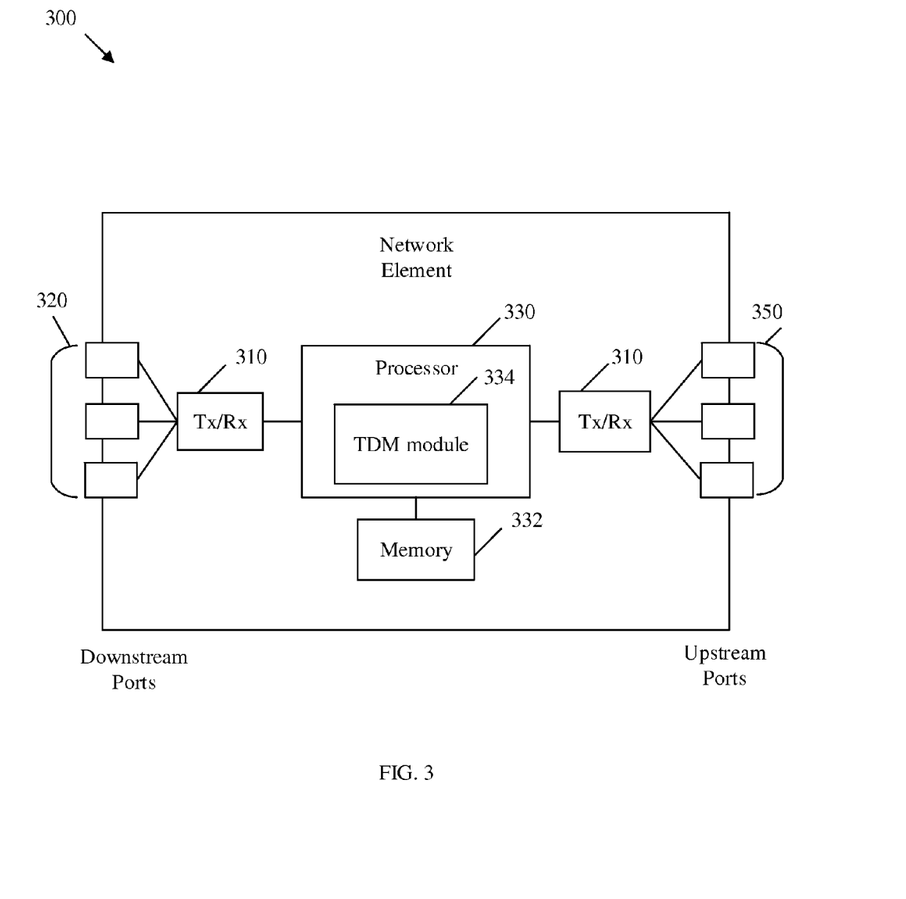
FIG. 3 is a schematic diagram of an embodiment of a network element (NE) within a PON.

FIG. 3 is a schematic diagram of an embodiment of a NE 300 within a PON, such as an OLT 110, OLT 210, ONU 120, and/or ONU 220. NE 300 may be configured to transmit and/or receive TDM based transmissions over a multi-mode fiber. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 300. For instance, the features/methods in the disclosure may be implemented using hardware, firmware, and/or software installed to run on hardware. The NE 300 may be any device that transports frames through a network, e.g., a switch, router, bridge, server, a client, etc. As shown in FIG. 3, the NE 300 may comprise transceivers (Tx/Rx) 310, which may be transmitters, receivers, or combinations thereof. A Tx/Rx 310 may be coupled to a plurality of downstream ports 320 (e.g. downstream interfaces) for transmitting and/or receiving frames from other nodes and a Tx/Rx 310 coupled to a plurality of upstream ports 350 (e.g. upstream interfaces) for transmitting and/or receiving frames from other nodes, respectively. A processor 330 may be coupled to the Tx/Rxs 310 to process the frames and/or determine which nodes to send frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise a TDM module 334, which may implement the methods discussed herein such as scheduling transmission timeslots, when the NE 300 is an OLT, or initiating transmissions based on schedule data, when NE 300 is an ONU. In an alternative embodiment, the TDM module 334 may be implemented as instructions stored in memory 332, which may be executed by processor 330, or implemented in part in the processor 330 and in part in the memory 332. In another alternative embodiment, the TDM module 334 may be implemented on separate NEs. The downstream ports 320 and/or upstream ports 350 may contain electrical and/or optical transmitting and/or receiving components.

It is understood that by programming and/or loading executable instructions onto the NE 300, at least one of the processor 330, TDM module 334, Tx/Rxs 310, memory 332, downstream ports 320, and/or upstream ports 350 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
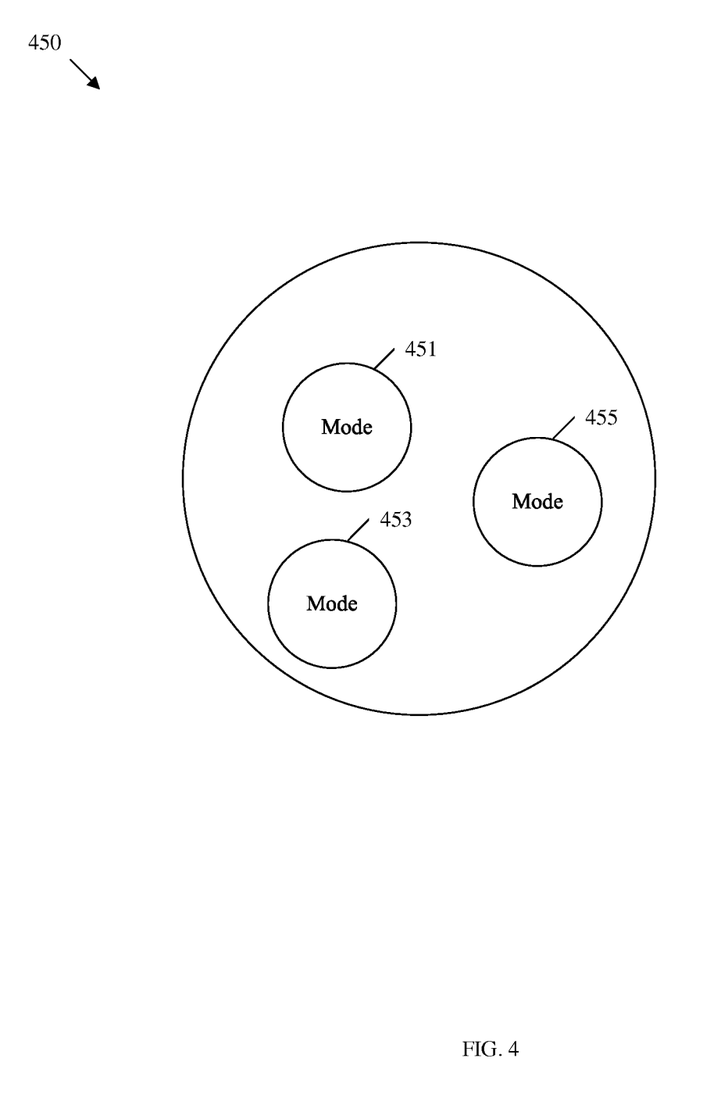
FIG. 4 illustrates an embodiment of a multi-mode fiber core.

FIG. 4 illustrates an embodiment of a multi-mode fiber core 450, such as a cross-sectional view of few mode fiber 250. Light signals may travel along the few mode fiber, and may be visible to a receiver, such as Rx 212, as mode 451, mode 452, and/or mode 453. While only three modes are shown on fiber core 450 a multi-mode fiber may be manufactured to support any number of modes depending on the material of the fiber and the diameter of the fiber. For example, a larger fiber may support more modes, while a smaller fiber may support fewer modes.

As shown in FIG. 4, modes 451-453 may be separated in space when transmitted to allow the receiver to distinguish between signals. However, over longer distances, the size and shape of the modes may become distorted. For example, modes 451-453 may each become larger, which may cause the modes 451-453 to overlap in space. When modes 451-453 overlap, the receiver may be unable to distinguish between signals (e.g. interference). Furthermore, the signal in a specific mode may become coupled into another mode (e.g. from mode 451 to mode 453) due to perturbations and/or irregularities along the fiber 250. By separating the signals associated with modes 451-453 in time, such interference may be substantially eliminated at the cost of bandwidth/throughput. For example, if modes are separated in time, all light can be assumed to be part of the currently transmitting mode even if some of the light has diffused out of the expected location for the mode. As a long range PON may be more limited by power budget than bandwidth in the upstream direction, a reduction in bandwidth for an elimination of interference may be an acceptable trade-off.

Figure 5:
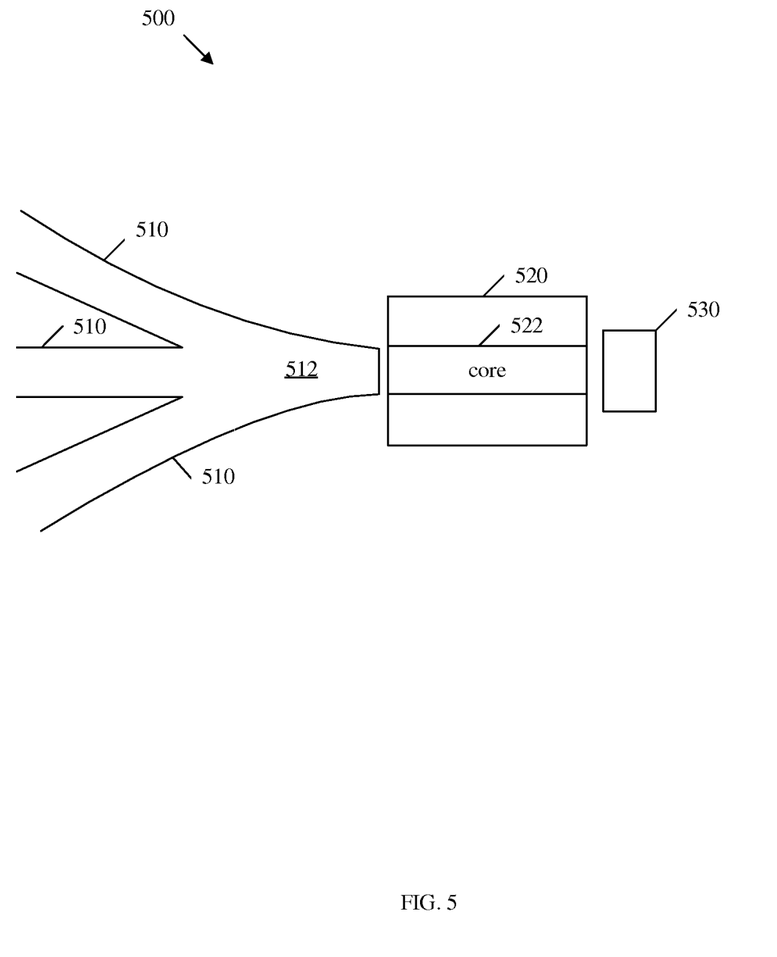
FIG. 5 is a schematic diagram of an embodiment of a mode coupler.

FIG. 5 is a schematic diagram of an embodiment of a mode coupler 500, such as a mode coupler 240. Specifically, mode coupler 500 may be a fused fiber coupler, may act as a low-loss mode coupling receiver used for mode coupling and detection in a long-reach PON. The mode coupler 500 may comprise at least some of the mode coupling and detection components of the long-reach/large-splitting PON 200 and may be used to couple a plurality of upstream optical signals from the ONUs (e.g. ONUs 220) into different optical modes that may be detected at an OLT, such as OLT 210, by detector 530. The mode coupler 500 may increase the power budget for upstream transmission. The mode coupler 500 may comprise a plurality of single mode fibers 510, a fused portion 512, and a multi-mode fiber 520, such as few mode fiber 250, comprising a core 522.

The single mode fibers 510 may be single mode fibers and may transport an upstream optical signal from one or more of the ONUs, e.g. via ODNs. Each of the single mode fibers 510 may comprise a tapered tip at one end, which may be coupled to (e.g. positioned in close proximity to) one end of the multi-mode fiber 520. Additionally, the single mode fibers 510 may each be tilted at a corresponding angle with respect to the orientation of the multi-mode fiber 520. To reduce the insertion loss of the single mode fibers 510, the angle of each single mode fiber 510 may be within the acceptance angle of the multi-mode fiber 520. The single mode fibers 510 may be fused at the fused portion 512, which may be coupled to the multi-mode fiber 520. Fusing the single mode fibers 510 may remove an air void between the single mode fibers 510, where the fused portion 512 may have a cone shape that reduces the combined diameter of the single mode fibers 510. As such, the fused portion 512 may have a diameter smaller than the multi-mode fiber 520, for instance which may be equal to about the core 522 of the multi-mode fiber 520. The core 522 may be configured to confine and support the propagation of the modes, e.g. based on internal reflection effect, in the multi-mode fiber 520. The fused portion 512 may have a plurality of cores corresponding to the single mode fibers 510, which may be coupled effectively to the single core of the multi-mode fiber 520.

The dimensions and orientation of the single mode fibers 510 and the distance between the fused portion 512 and the multi-mode fiber 520 may be designed based on the diameters of the single mode fibers 510 and the multi-mode fiber 520 to increase the amount of optical energy that can be coupled between the fibers and reduce the insertion loss of the fibers. Further, the quantity of single mode fibers 510 that may be coupled to the multi-mode fiber 520 may be based on the diameters of the single mode fibers 510 and the multi-mode fiber 520. For instance, about three or about four single mode fibers 510 may be coupled to the multi-mode fiber 520 to provide about 1:3 or about 1:4 splitting ratio, respectively. In an embodiment, the tapered tips of the single mode fibers 510 may have a lens shape to further improve optical coupling between the single mode fibers 510 and the multi-mode fiber 520.

The multi-mode fiber 520 may have a total diameter that is larger than the combined single mode fibers 510 and may have a length of more than 100 m (e.g. 500 m, one km, five km, ten km, fifteen km, twenty km, twenty five km, thirty km, thirty-five km, forty km, etc.) For instance, the multi-mode fiber 520 may be long enough to allow the propagation of the coupled modes from the single mode fibers 510 in the field near the ODNs to the detector 530 at an OLT in a central office. The detector 530 may be an optical detector, also referred to as photosensor or photodetector, such as a photodiode, an avalanche photodiode (APD), or a photocell. The detector 530 may convert the optical signals corresponding to the optical modes into electrical signals that may be further processed for communication purposes. In some embodiments, the fiber coupler 500 may comprise at least one lens (not shown), which may be positioned between the single mode fibers 510 and the multi-mode fiber 520 to further improve optical coupling between the fibers. Additionally, a silicon bench comprising a plurality of V-shaped groves may be used to align the single mode fibers 510 and the multi-mode fiber 520.

In some embodiments, at least one lens may be positioned between the multi-core fused portion 512 and the multimode fiber 520 to further improve optical coupling and reduce insertion loss. The cores in the fused portion 512 may be closer to each other and have smaller diameters than in the separate cores of the single mode fibers 510, and therefore may have more inter-coupling of optical power between another. This inter-coupling between the cores may be tolerated as long as the optical power from all the cores may be substantially coupled into the multimode fiber 520. Additional embodiments of mode couplers may be employed within the course and scope of the present disclosure, such as waveguide based couplers, non-fused couplers, prism couplers, and any other couplers disclosed in U.S. Pat. No. 8,515,278, as modified to support long distance transmission (e.g. 100 m, 500 m, one km, five km, ten km, fifteen km, twenty km, twenty five km, thirty km, thirty-five km, forty km, etc.) of multi-mode signals from an ODN to an OLT via a multimode fiber.

Figure 6:
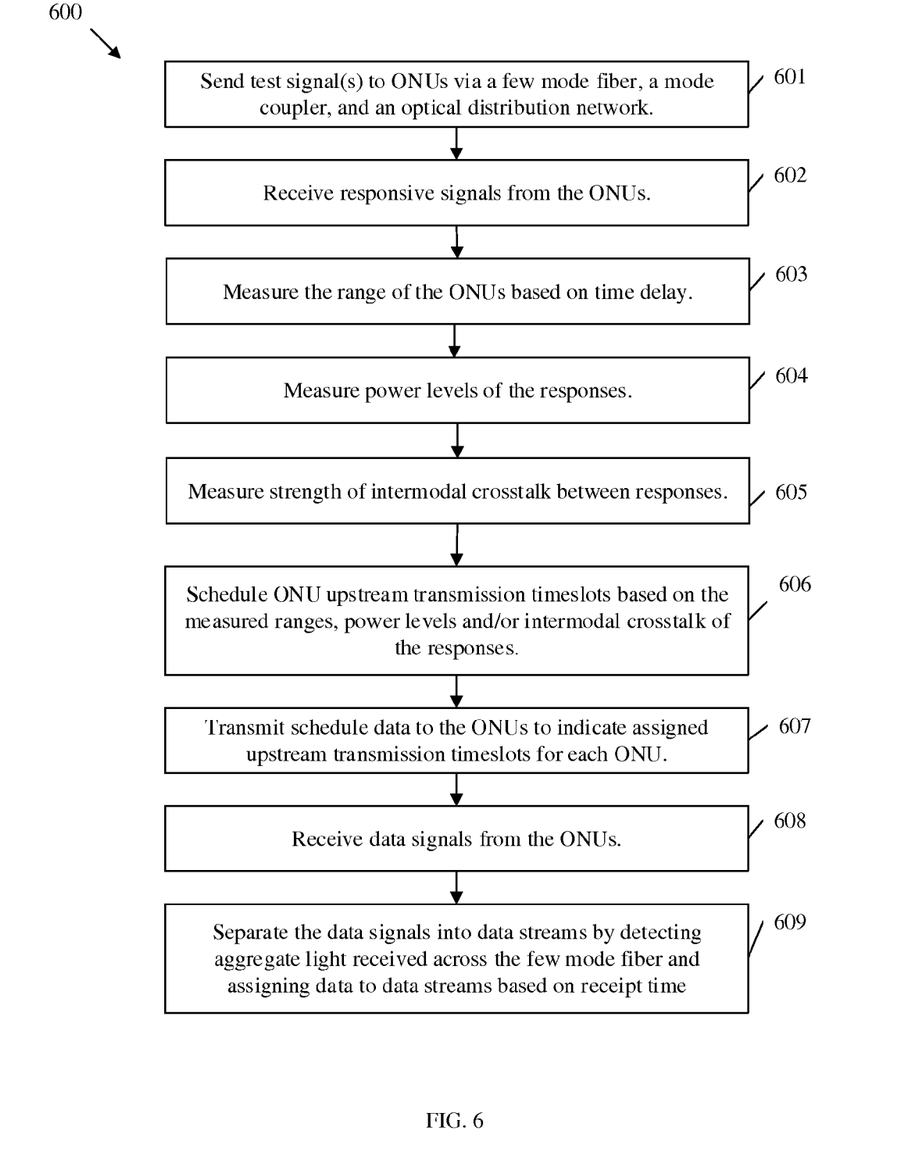
FIG. 6 is a flowchart of an embodiment of a method of scheduling multi-mode transmissions across a multi-mode/few mode fiber.

FIG. 6 is a flowchart of an embodiment of a method 600 of scheduling multi-mode transmissions across a multi-mode/few mode fiber, such as few mode fiber 250 of network 200. Method 600 may be implemented in an OLT, such as OLT 210, to schedule upstream transmission from a plurality of ONUs, such as ONUs 220. At step 601, method 600 may send one or more test signals to downstream ONUs. The test signals may be transmitted via a few mode fiber, an optical coupler, and one or more ODNs, such as few mode fiber 250, optical coupler 240 and/or 500, and/or ODNs 230, respectively. At step 602, responsive signals may be received from the ONUs. At step 603, the range of the ONUs may be measured based on the time delay between the test signal(s) of step 601 and the responses of step 602. Knowledge of the range of each ONU may allow time delays associated with distance to be considered when scheduling ONU upstream transmissions. At step 604, the power levels of each response may be measured and/or stored. For example, a range of power levels of up to twenty dB between most powerful ONU responses to least powerful ONU responses is possible. At step 605, the strength of intermodal cross-talk between ONU responses may be measured. Intermodal crosstalk may occur in a TDM system due to geometry associated with the transmission modes of each ONU and/or refractive properties associated with the few mode fiber, which may cause optical signals to travel across the fiber at different speeds. Intermodal crosstalk in this context may be preceding and/or succeeding. Preceding crosstalk may occur when a portion of a signal associated with a time slot arrives at a receiver early (e.g. during a preceding timeslot) due to uneven propagation delay between modes across the few mode fiber. Succeeding crosstalk may occur when a portion of a signal associated with a time slot arrives at a receiver late (e.g. during a succeeding timeslot). Higher order modes may travel faster than lower order modes, which may result in predictable time based collisions of the signals. Time shifted intermodal crosstalk may be significantly weaker than the direct signal (e.g. about 10 dB weaker), but may cause significant disruption when the cross-talk affects ONUs of differing power levels.

At step 606, the ONU upstream transmissions may be scheduled into timeslots based on the measured ranges, power levels, and/or intermodal crosstalk of the responses (e.g. as measured in steps 603-605, respectively). By scheduling based on ONU power level and/or intermodal crosstalk, signals received at the OLT may be substantially free of noise. At step 607, schedule data may be transmitted to the ONUs to indicate assigned upstream timeslots for each ONU. At step 608, data signals may be received from the ONUs according to the schedule data of step 607. At step 609, the data signals may be separated into data streams by detecting aggregate light received across the few mode fiber and assigning data to data streams based on receipt time (e.g. by comparing receipt time to the schedule data to determine sender). Such data streams may then be transmitted further upstream, for example, across the Internet via optical and/or electrical network(s) attached upstream from an OLT implementing method 600. As such, an OLT implementing method 600 may schedule upstream communications from a plurality of ONUs across a few mode/multi-mode fiber using TDM/TDMA by accounting for range, power level, and/or intermodal crosstalk. Method 600 may allow associated multi-mode signals to traverse long lengths of multi-mode optical fiber and remain distinguishable and/or comprehensible to a receiver.

Figure 7:
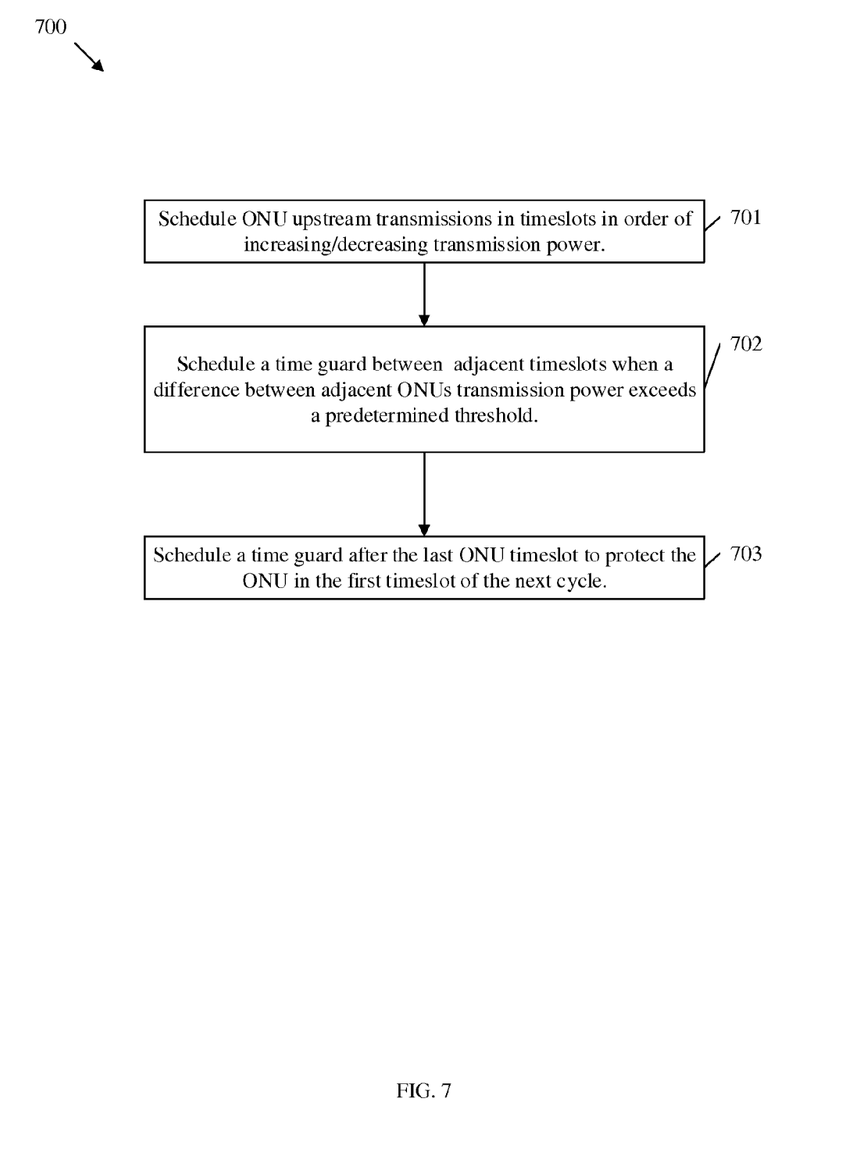
FIG. 7 is a flowchart of another embodiment of a method of scheduling multi-mode transmissions across a multi-mode/few mode fiber.

FIG. 7 is a flowchart of another embodiment of a method 700 of scheduling multi-mode transmissions across a multi-mode/few mode fiber, such as few mode fiber 250 of network 200. Specifically, method 700 may be employed as a specific embodiment of a scheduling algorithm employed in step 606 of method 600. At step 701, ONU upstream transmissions may be scheduled in timeslots in order of increasing or decreasing transmission power. As discussed above, intermodal interference may occur in a TDM based multi-mode system when a portion of a signal from a first timeslot arrives during a preceding or succeeding timeslot. Such interference may be accounted for when the adjacent signals are of a similar power level. However, when adjacent signals are of dissimilar power levels, the higher power signal may overwhelm the lower power signal, making all or a portion of the lower power signal unusable. Arranging the ONUs in power order may create a normalized power distribution across the schedule and may reduce power variations between ONUs in adjacent timeslots, which may result in manageable levels of intermodal interference.

While step 701 may reduce power variations between most adjacent time slots, there may still be instances where significant power variations between adjacent time slots exist. For example, if half of the ONUs are high power and half of the ONUs are low power with no mid-range power ONUs, then the ONU with the lowest power of the high power group would be scheduled adjacent to the ONU with the highest power of the low power group. This scenario may result in significant intermodal interference between the ONUs at the edges of the two groups. Step 702 may address this scenario by scheduling a time guard between adjacent timeslots when the difference between adjacent ONU transmission power exceeds a threshold. The threshold may be predetermined and/or adjustable and may be based on the ability of a particular OLT to manage intermodal interference. For example, the threshold may be lowered to create more time guards if an OLT is generally unable to account for significant intermodal interference and the threshold may be raised to create fewer time guards (e.g. thereby increasing throughput) if an OLT is equipped with a robust system for managing/accounting for intermodal interference. Further, the threshold may be adjusted as needed to reduce errors related to intermodal interference.

ONUs may be scheduled to transmit in cycles. When the ONUs are arranged by power according to step 701, the ONUs at the start and end of each cycle may be the ONUs with the most extreme power levels (e.g. highest and lowest or lowest and highest, depending on ordering scheme). To mitigate intermodal cross-talk between cycles, step 703 may schedule a time guard after the last ONU timeslot in a cycle to protect the ONU in the first timeslot of the next cycle (or vice versa) from intermodal interference. It should be noted that method 700 may be performed to schedule ONU transmissions based on power without actively measuring the intermodal interference associated with the ONUs.

Figure 8:
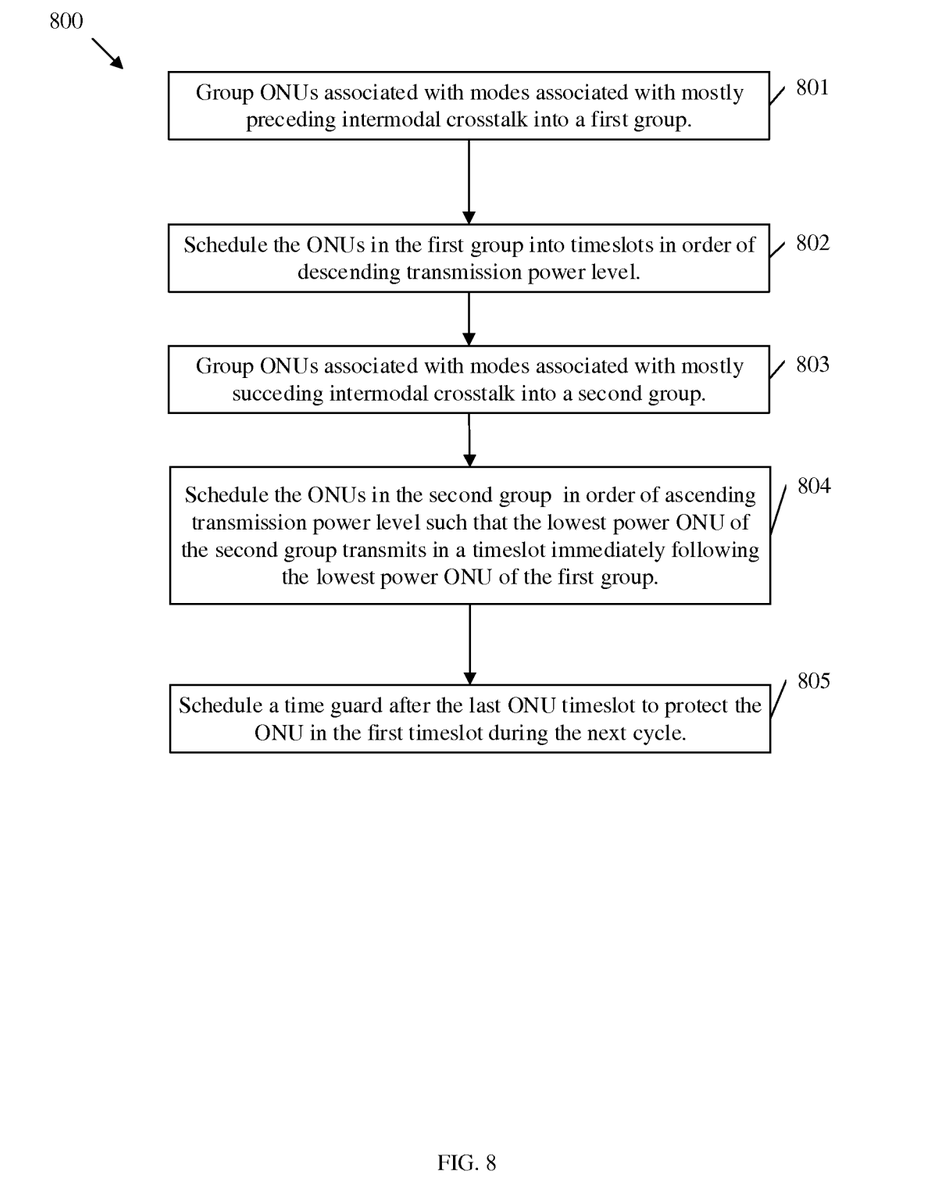
FIG. 8 is a flowchart of another embodiment of a method of scheduling multi-mode transmissions across a multi-mode/few mode fiber.

FIG. 8 is a flowchart of another embodiment of a method 800 of scheduling multi-mode transmissions across a multi-mode/few mode fiber, such as few mode fiber 250 of network 200. Specifically, method 800 may be employed as another specific embodiment of a scheduling algorithm employed in step 606 of method 600. In contrast with method 700, method 800 may employ measurements and/or known characteristics of intermodal crosstalk to further mitigate intermodal crosstalk. As discussed above, intermodal crosstalk in a TDM based system may result when portions of a signal precede or succeed as assigned timeslot. Whether a signal precedes or succeeds an assigned timeslot may depend on the mode of the signal. In order to reduce such intermodal interference, step 801 may group ONUs associated with modes that are associated with mostly preceding intermodal crosstalk into a first group. At step 802, the ONUs in the first group may be scheduled into timeslots in order of descending transmission power level. By employing steps 801-802, ONUs in the first group may primarily interfere with preceding timeslots, and by scheduling the ONUs in descending power order, each ONU of the first group may be of a lower power than the preceding adjacent ONU. As such, ONUs causing interference in the first group may generally be of a lower power than the ONU being interfered with. As such, intermodal crosstalk may be negligible in the first group.

At step 803, method 800 may group ONUs associated with modes associated with mostly succeeding intermodal crosstalk into a second group. At step 804, ONUs in the second group may be scheduled in order of ascending power level. By employing steps 803-804, ONUs in the second group may primarily interfere with succeeding timeslots, and by scheduling the ONUs in ascending power order, each ONU of the second group may be of a lower power than the succeeding adjacent ONU. As such, ONUs causing interference in the second group may generally be of a lower power than the ONU being interfered with. As such, intermodal crosstalk may be negligible in the second group. Further the ONUs of the second group may be scheduled such that the lowest power ONU of the second group (e.g. the first ONU of the second group) may be scheduled to transmit in a timeslot immediately following the lowest power ONU of the first group (e.g. the last ONU of the first group). By employing this schedule, the last ONU of the first group may not interfere with the ONU of the second group that follows it because the last ONU of the first group is primarily associated with preceding crosstalk. Conversely, the first ONU of the second group may not interfere with the ONU of the first group that precedes it because the first ONU of the second group is primarily associated with succeeding crosstalk.

At step 805, a time guard may be scheduled after the last ONU timeslot of the second group to protect the ONU in the first timeslot of the first group during the next cycle. Step 805 may mitigate crosstalk resulting from the preceding interference occurring from the first ONU of the first group and the succeeding interference from the last ONU of the second group between cycles. While the first ONU of the first group and the last ONU of the second group may counter clash somewhat, the ONUs may be of similar power levels (e.g. the high power level of each group). As such the transmissions of the first ONU of the first group and the last ONU of the second group may each be naturally resistant to cross-talk because of the direct strength of each signal. Further, in some embodiments, additional time guards may be added as needed when power differentials between adjacent ONUs exceed a threshold as in method 700.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT) comprising:
    a receiver configured to:
        couple to a mode coupler via a multi-mode optical fiber that supports more than one optical communication mode; and
        couple to a plurality of optical network units (ONUs) via the mode coupler;
    a processor coupled to the receiver and configured to schedule upstream multi-mode transmissions from the ONUs via the multi-mode fiber and the mode coupler by employing time division multiplexing (TDM) or time division multiple access (TDMA); and
    a transmitter coupled to the processor and configured to transmit schedule data to the ONUs,
    wherein ONU transmissions are scheduled based on ONU transmission power level,
    wherein the processor is further configured to measure intermodal crosstalk between the ONUs, and
    wherein scheduling upstream multi-mode transmissions comprises:
        scheduling ONUs with primarily preceding intermodal crosstalk into adjacent time slots; and
        scheduling ONUs with primarily succeeding intermodal crosstalk into adjacent time slots.

2. The OLT of claim 1, wherein the receiver is further configured to receive the upstream multi-mode transmissions from the ONUs via the mode coupler and the multi-mode optical fiber, and wherein the upstream multi-mode transmissions are received over a continuous span of the multi-mode optical fiber with a length greater than five kilometers.

3. The OLT of claim 2, wherein the receiver is further configured to separate the upstream multi-mode transmissions into a plurality of data streams corresponding to each ONU, and wherein separating the upstream multi-mode transmissions into the plurality of data streams does not comprise coherent detection.

4. The OLT of claim 1, wherein the multi-mode fiber is a few mode fiber that supports less than ten modes.

5. The OLT of claim 3, wherein the receiver comprises a single optical detector, and wherein separating the upstream multi-mode transmissions into the plurality of data streams comprises detecting aggregate light from the multi-mode optical fiber and separating the data streams based on time slot.

6. The OLT of claim 1, wherein scheduling based on ONU transmission power level comprises scheduling ONU transmissions in order of increasing ONU transmission power level to reduce mode related interference between timeslots.

7. The OLT of claim 6, wherein scheduling based on ONU transmission power level further comprises scheduling a time guard between adjacent ONU timeslots when a difference in ONU transmission power between ONUs scheduled in the adjacent ONU timeslots is greater than a predetermined threshold.

8. The OLT of claim 1, wherein the processor is further configured to measure intermodal crosstalk between the ONUs, and wherein scheduling upstream multi-mode transmissions comprises:
scheduling ONUs with preceding intermodal crosstalk into a first group;
scheduling ONUs in the first group in order of decreasing ONU transmission power level;
scheduling ONUs with succeeding intermodal crosstalk into a second group;
scheduling the second group after the first group; and
scheduling ONUs in the second group in order of increasing ONU transmission power level.

9. A method implemented in an optical line terminal (OLT) comprising:
communicating with a plurality of optical network units (ONUs) using time division multiplexing (TDM) or time division multiple access (TDMA) for upstream optical signals traversing a mode coupler and a multi-mode optical fiber that supports more than one optical communication mode, wherein the multi-mode fiber traversed by the upstream optical signals comprises a continuous span of the multi-mode optical fiber with a length greater than one kilometer;
measuring the upstream optical signals from the ONUs to determine power levels exhibited by the upstream optical signals;
measuring intermodal crosstalk between the ONUs;
scheduling upstream communication timeslots for the ONUs such that upstream optical signals are arranged in time order based on power level, wherein scheduling upstream communication timeslots comprises:
scheduling ONUs with preceding intermodal crosstalk into adjacent time slots; and scheduling ONUs with succeeding intermodal crosstalk into adjacent time slots; and
transmitting schedule data to the ONUs.

10. The method of claim 9, wherein scheduling upstream communication timeslots for the ONUs comprises arranging the timeslots in order of increasing ONU signal power to mitigate mode related interference between timeslots.

11. The method of claim 10, wherein scheduling upstream communication timeslots further comprises scheduling a guard time between adjacent timeslots when a difference in ONU signal power between ONUs scheduled in the adjacent timeslots is greater than a predetermined threshold.

12. The method of claim 9, wherein scheduling upstream communication timeslots for the ONUs comprises arranging the timeslots in order of decreasing ONU signal power to mitigate mode related interference between timeslots.

13. The method of claim 9, wherein scheduling upstream communication timeslots for the ONUs further comprises:
scheduling ONUs with the preceding intermodal crosstalk into a first group;
scheduling ONUs in the first group in order of decreasing ONU transmission power level;
scheduling ONUs with the succeeding intermodal crosstalk into a second group;
scheduling the second group after the first group; and
scheduling ONUs in the second group in order of increasing ONU transmission power level.

14. The method of claim 13, wherein scheduling upstream communication timeslots for the ONUs further comprises scheduling a time guard after the last ONU in the second group to protect the first ONU in the first group between cycles.

15. An optical line terminal (OLT) comprising:
a receiver configured to:
couple to a plurality of optical network units (ONUs) via a multi-mode optical fiber that supports more than one optical communication mode, a mode coupler, and a plurality of single mode optical fibers;
receive upstream data signals from the ONUs via the multi-mode optical fiber, wherein the upstream data signals are received in a plurality of modes, wherein the upstream data signals are not received simultaneously regardless of data signal mode, and wherein the received upstream data signals are received over a continuous span of the multi-mode optical fiber with a length greater than five hundred meters; and
separate the upstream data signals into a plurality of data streams corresponding to each transmitting ONU; and
a processor coupled to the receiver and configured to:
determine intermodal crosstalk between the ONUs; and
schedule ONU transmissions based on ONU transmission power level,
wherein scheduling ONU transmissions based on ONU transmission power level comprises:
scheduling ONUs with preceding intermodal crosstalk into adjacent time slots; and
scheduling ONUs with succeeding intermodal crosstalk into adjacent time slots.

16. The OLT of claim 15, wherein separating the upstream data signals received via the multi-mode optical fiber into the plurality of data streams does not comprise coherent detection.

17. The OLT of claim 15, wherein the receiver comprises a single optical detector, and wherein separating the upstream data signals into a plurality of data streams comprises detecting aggregate light from the multi-mode optical fiber and separating the data streams based on time of reception.

18. The OLT of claim 15, wherein the upstream data signals are separated based on time of reception and based on a schedule, and wherein the schedule:
groups ONUs with preceding intermodal crosstalk into a first group;
orders ONUs in the first group in order of decreasing ONU transmission power level;
groups ONUs with succeeding intermodal crosstalk into a second group;
orders the second group after the first group;
orders ONUs in the second group in order of increasing ONU transmission power level; and
comprises a time guard between a last ONU in the second group and a first ONU in the first group.

* * * * *